Nov. 8, 1932.  L. MOTLEY  1,887,458

LIQUID FUEL BURNING APPARATUS

Original Filed Jan. 28, 1930

Patented Nov. 8, 1932

1,887,458

UNITED STATES PATENT OFFICE

LEWIS MOTLEY, OF STAINES, ENGLAND

LIQUID FUEL BURNING APPARATUS

Original application filed January 28, 1930, Serial No. 424,018, and in Great Britain May 17, 1929. Divided and this application filed November 29, 1930. Serial No. 499,091.

This invention relates to liquid fuel burning apparatus disclosed in my application Serial No. 424,018 filed January 28, 1930 (of which this application is a division) and has for its object to provide apparatus of simplified construction and more efficient than used heretofore.

In the present invention the liquid fuel is supplied to the burner under pressure, the pressure being obtained either by pneumatic or hydraulic means.

The stove or heating portion of the apparatus has a hot plate provided with a number of openings, and between the openings are arranged projections extending upwards each projection being preferably conical and of the same height. The base of the utensil or apparatus to be heated is provided with a series of depending projections each arranged vertically over an opening in the hot plate, positioning lugs or flanges being provided on the receptacle or the hot plate so as to ensure each depending lug being opposite a perforation in the hot plate and therefore depending into the diffused flame of the burner and so forming an annular heating space for the hot gases, as well as considerably increasing the heating surfaces.

In order that the invention may be the more clearly understood reference will now be made to the accompanying drawing, wherein:—

Figure 2 is a plan view thereof, while

Figure 3 is a plan of one form of base portion of the utensil.

Figure 1:
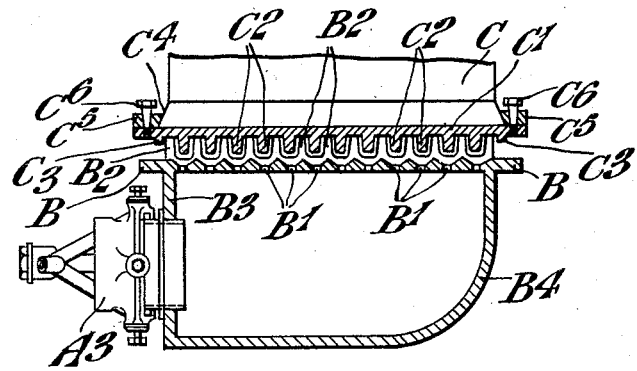
Figure 1 is a sectional elevation of the apparatus.
Figures 2, 3:
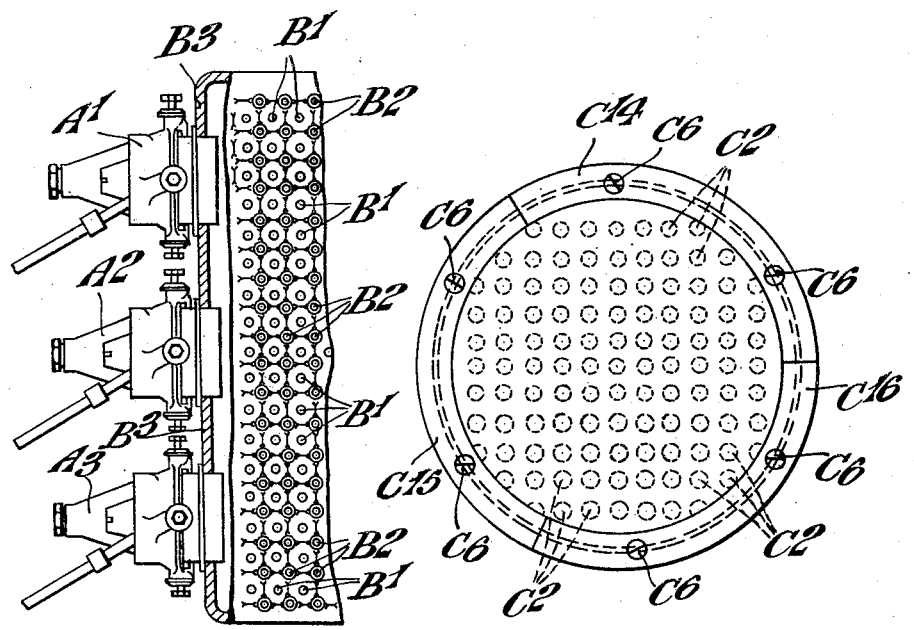

In the hot plate B are provided flame holes B1 arranged between upwardly extending tapered projections B2. On these projections rest a utensil C having a detachable base piece C1 provided with depending projections C2 arranged to be substantially co-axial with the flame holes B1 and so as to form an annular flame space around each projection C2. Around the side of the base C1 are provided lugs or broken rings C3 for positioning the utensil with C on the hot plate B. The base C1 of the utensil C is detachably fixed on a conical base C4 by means of a ring C5 having an inner inclined portion corresponding to the conical portion C4 of the utensil C. The ring C5 is divided into three sections C14, C15, C16, each of which is detachably held to the base C1 by means of screws C6. The hot plate B is supported at the desired height above the opening in the base or standard B3 supporting the burners A1, A2, and A3 which are arranged horizontally and so that the flame therefrom will be bent upwards and pass through the flame holes B1 in the hot plate B. Beneath the flame and supported by or forming part of the standard B3 is a casing B4 curved upwards to correspond with the shape of the flame.

The base of the utensil C is preferably made of a non-corroding material such as cast aluminium, or stainless steel.

The provision of the projections C2 on the utensil bottom increases the heating area of the utensil thereby ensuring a more rapid heating of the contents of the utensil, and also permitting of a more even expansion of the utensil bottom under the intense heat to which it is of necessity subjected in practice, than is possible with utensils having corrugated or flanged bottoms, which are subject to cracking and distortion.

What I claim and desire to secure by Letters Patent is:—

1. A liquid fuel or gas burning apparatus, comprising a hot plate having flame holes and upward projections and a utensil having a base provided with downward projections, each of the downward projections of the utensil when the utensil is on the hot plate being co-axial with a corresponding flame hole in the hot plate and forming an annular flame space above the flame hole.

2. A liquid fuel or gas burning apparatus, comprising a hot plate having flame holes and upward projections and a utensil having a base provided with downward projections, lugs on the base of the utensil to position the utensil on the hot plate with each of the downward projections of the utensil co-axial with a corresponding flame hole in the hot plate and forming an annular flame space above the flame hole.

3. A liquid fuel or gas burning apparatus, comprising a hot plate having flame holes and upward projections and a utensil having a detachable base provided with downward projections, lugs on the detachable base of the utensil for positioning the utensil on the hot plate with each of the downward projections of the utensil coaxial with a corresponding flame hole in the hot plate for forming an annular flame space above the flame hole.

4. A liquid fuel, gas or the like cooking and heating stove, comprising a hot plate having flame holes and upward projections, a utensil, a flange on the base of the utensil, a second and detachable base portion provided with downward projections and a section ring having an inner inclined portion, the section ring on the detachable base engaging with the flange of the base proper of the utensil to hold the detachable base in position on the utensil, and lugs on the detachable base for positioning the utensil on the hot plate with each of the downward projections of the utensil co-axial with a corresponding flame hole in the hot plate for forming an annular flame space above the flame hole.

5. A liquid fuel burning apparatus, comprising a hot plate provided with a plurality of flame holes, a utensil, means for positioning the base of the utensil on the hot plate over the flame holes, and means for passing the products of combustion of the liquid fuel through the flame holes in the hot plate, the hot plate having a plurality of upward projections while the base of the utensil has a plurality of downward projections which are co-axial with the flame holes in the hot plate so that an annular flame space is formed above each flame hole.

6. A liquid fuel burning apparatus, comprising a hot plate provided with a plurality of flame holes, a utensil, positioning lugs depending from the base of the utensil for positioning the base of the utensil on the hot plate over the flame holes, and means for passing the products of combustion of the liquid fuel through the flame holes in the hot plate, the hot plate having a plurality of upward projections of which the outer members are engaged by the positioning lugs depending from the base of the utensil while the base of the utensil has a plurality of downward projections which are co-axial with the flame holes in the hot plate so that an annular flame space is formed above each flame hole.

In witness whereof I affix my signature.

LEWIS MOTLEY.